(12) United States Patent
Sun

(10) Patent No.: US 12,728,658 B1
(45) Date of Patent: Sep. 8, 2026

(54) MARKING DEVICE FOR PRINTING LOGO PATTERNS ON A SURFACE OF A PLASTIC TUBING AND METHOD FOR MARKING THE PLASTIC TUBING

(71) Applicant: Chien-Jieh Sun, Taipei City (TW)

(72) Inventor: Chien-Jieh Sun, Taipei City (TW)

( * ) Notice: Subject to any disclaimer, the term of this patent is extended or adjusted under 35 U.S.C. 154(b) by 0 days.

(21) Appl. No.: 19/408,796

(22) Filed: Dec. 4, 2025

(51) Int. Cl.

| | |
|---|---|
| ***B41M 5/035*** | (2006.01) |
| ***B41F 16/00*** | (2006.01) |
| *B29C 48/00* | (2019.01) |
| *B29L 23/00* | (2006.01) |

(52) U.S. Cl.
CPC ....... *B41M 5/0358* (2013.01); *B41F 16/0086* (2013.01); *B41F 16/0093* (2013.01); *B29C 48/0023* (2019.02); *B29L 2023/00* (2013.01)

(58) Field of Classification Search
None
See application file for complete search history.

(56) References Cited

U.S. PATENT DOCUMENTS

2008/0250949 A1* 10/2008 Hanzel .................... B41F 16/00 101/41

OTHER PUBLICATIONS

Plextrusions, Inc. (https://plextrusions.com/capabilities/in-line-printing). Retrieved from the Internet Archive, https://web.archive.org/web/20240621231844/https://plextrusions.com/capabilities/in-line-printing, captured on Jun. 21, 2024 (Year: 2024).*

* cited by examiner

*Primary Examiner* — Joshua D Zimmerman
(74) *Attorney, Agent, or Firm* — Best & Flanagan LLP

(57) ABSTRACT

A marking device comprises a transfer printing unit, a peeling unit, and a cooling unit. The transfer printing unit is disposed on an output side of a plastic extrusion machine. The transfer printing unit includes a transfer printing tape having a surface with logo patterns. A pressing rod presses the transfer printing tape against a surface of a plastic tubing. The logo patterns are transferred to the plastic tubing through transfer printing by the heat of the plastic tubing generated during formation of the plastic tubing. The peeling unit is disposed on a side of the transfer printing unit remote from the plastic extrusion machine and includes a peeling end for separating the transfer printing tape from the plastic tubing. The cooling unit is disposed on a side of the peeling unit remote from the plastic extrusion machine and includes a guiding tube for cooling the plastic tubing.

8 Claims, 3 Drawing Sheets

MARKING DEVICE FOR PRINTING LOGO PATTERNS ON A SURFACE OF A PLASTIC TUBING AND METHOD FOR MARKING THE PLASTIC TUBING

BACKGROUND OF THE INVENTION

The present invention relates to a marking device for printing logo patterns on a surface of a plastic tubing and a method for marking the surface of the plastic tubing and, more particularly, to a device capable of enhancing the convenience, stability, and anti-counterfeiting effect of forming logo patterns on a tubing surface.

A plastic tubing is generally formed as an elongated object by extrusion. To provide an anti-counterfeiting effect, trademarks of the manufacturer or the specifications are printed on an outer surface of a tubing by laser printing, and the printed trademarks or specifications are spaced from each other by an appropriate spacing. Furthermore, to increase the printing efficiency, logo patterns spaced from each other by several meters are generally printed on an elongated tubing to enable the user to identify the source of production.

However, the user purchasing the tubing generally has to cut the tubing to a suitable length according to the use condition, such that the length of the cut tubing may not include the logo pattern when the length of the cut tubing is smaller than the spacing between logo patterns. As a result, counterfeit product may be produced. In an approach to solve this situation, the logo patterns of a small spacing may be printed on the tubing through laser printing, which significantly increases the time for printing and has low printing efficiency, thereby failing to provide economical benefits.

BRIEF SUMMARY OF THE INVENTION

An objective of the present invention is to provide a marking device for printing densely distributed logo patterns on a surface of a plastic tubing and a method for marking the surface of the plastic tubing, thereby providing enhanced printing efficiency, stable marking effect, and anti-counterfeit effect.

In an aspect, a marking device is provided to print logo patterns on a surface of a plastic tubing. The marking device is configured to be disposed on an output side of a plastic extrusion machine. The plastic tubing is outputted to the output side and moves rectilinearly. The marking device comprises:

- a transfer printing unit configured to be disposed on the output side of the plastic extrusion machine, wherein the transfer printing unit includes a transfer printing tape and a pressing rod, wherein the transfer printing tape includes a surface having a plurality of logo patterns, wherein the pressing rod is configured to be disposed above the plastic tubing, wherein the pressing rod is configured to press the transfer printing tape against the surface of the plastic tubing, and the plurality of logo patterns is transferred to the plastic tubing through transfer printing by heat of the plastic tubing generated during formation of the plastic tubing;
- a peeling unit disposed on a side of the transfer printing unit remote from the plastic extrusion machine, wherein the peeling unit includes a peeling end configured to separate the transfer printing tape from the plastic tubing; and

- a cooling unit disposed on a side of the peeling unit remote from the plastic extrusion machine, wherein the cooling unit includes a guiding tube for cooling the plastic tubing.

In an example, the transfer printing unit further includes a shaft. The transfer printing tape is coiled and has a central axial hole. The shaft is configured to be disposed on a side of the plastic tubing and extends through the central axial hole of the transfer printing tape. An end of the transfer printing tape is attached to the surface of the plastic tubing.

In an example, the plurality of logo patterns may be continuous or spaced at intervals.

In an example, the peeling unit includes a sleeve mounted around the plastic tubing, and the peeling end is located on an end of the sleeve remote from the plastic extrusion machine.

In an example, the guiding tube may output water for cooling the plastic tubing.

In an example, the guiding tube may be mounted to the peeling unit.

In another aspect, a method for marking a surface of a plastic tubing comprises:

- providing a transfer printing tape which is elongated and has a surface having a plurality of logo patterns;
- disposing the transfer printing tape on an output side of a plastic extrusion machine;
- disposing a cooling unit on a side of the transfer printing tape;
- outputting the plastic tubing by the plastic extrusion machine, attaching the transfer printing tape onto the surface of the plastic tubing which moves rectilinearly, and transfer printing the plurality of logo patterns onto the surface of the plastic tubing by heat of the plastic tubing generated during formation of the plastic tubing; and
- cooling the plastic tubing when the plastic tubing moves a position of the cooling unit, and separating the transfer printing tape from the plastic tubing, leaving the plurality of logo patterns firmly attached to the surface of the plastic tubing.

According to the present invention, when the plastic tubing is formed and outputted by the plastic extrusion machine, the temperature of the plastic tubing is still higher than the room temperature and is not fully solidified. Thus, the heat of the plastic tubing enables the logo patterns to be firmly printed onto the surface of the plastic tubing through transfer printing. Furthermore, when the transfer printing tape reaches the peeling end of the sleeve, the peeling end serves as a pressing point to separate the transfer printing tape from the plastic tubing. Furthermore, the plastic tubing entering the cooling unit is without the transfer printing tape. Furthermore, the guiding tube of the cooling unit may output water to cool the plastic tubing to thereby stabilize the solid shape of the plastic tubing. Furthermore, the logo patterns may be firmly attached to the outer surface of the plastic tubing and, thus, will not disengage from the surface of the plastic tubing due to high temperature.

According to the present invention, the heat generated during formation of the plastic tubing is used to stably print the logo patterns onto the surface of the plastic tubing through heat transfer printing without the need of additionally heating the plastic tubing. Furthermore, according to the present invention, when the plastic tubing is extruded out of the plastic extrusion machine, the plastic tubing moves rectilinearly without the need of an additional device for displacing the plastic tubing, thereby reducing the costs. According to the present invention, the logo patterns may provide an excellent marking effect. When the plastic tubing is cut into plural sections, each section of the plastic tubing may include at least one logo pattern, thereby providing better marking effect and anti-counterfeiting effect.

The present invention will become clearer in light of the following detailed description of illustrative embodiments of this invention described in connection with the drawings.

DETAILED DESCRIPTION OF THE INVENTION

Figure 1:
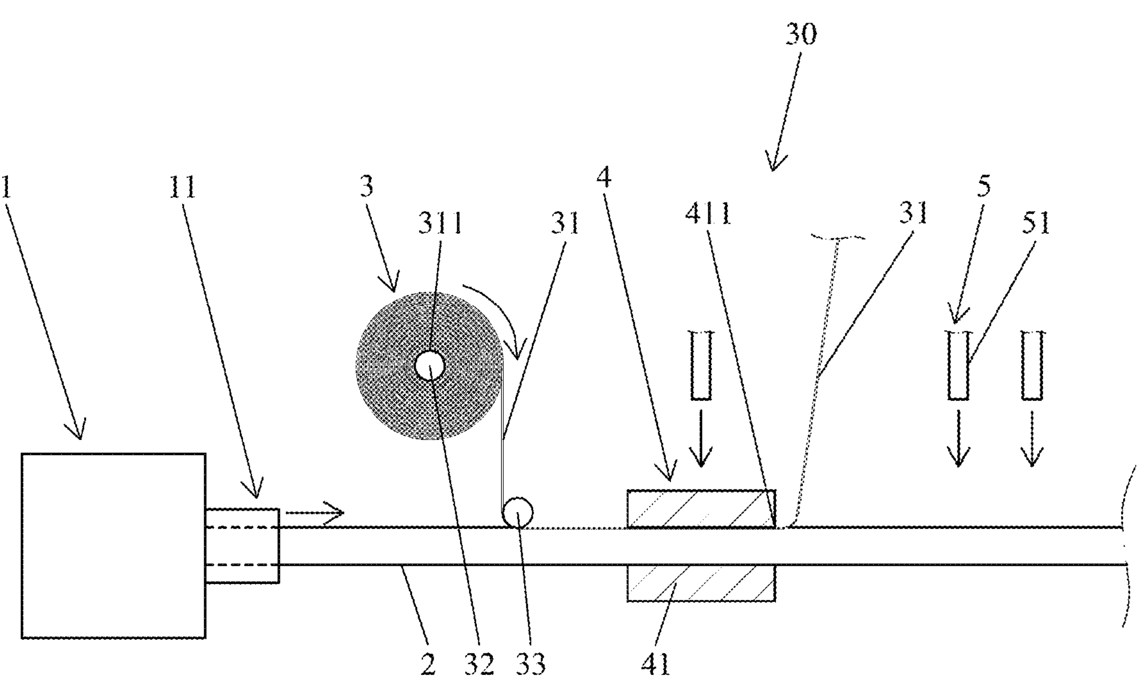
FIG. 1 is a schematic view illustrating a marking device for printing logo patterns on a surface of a plastic tubing according to the present invention.
Figure 2:
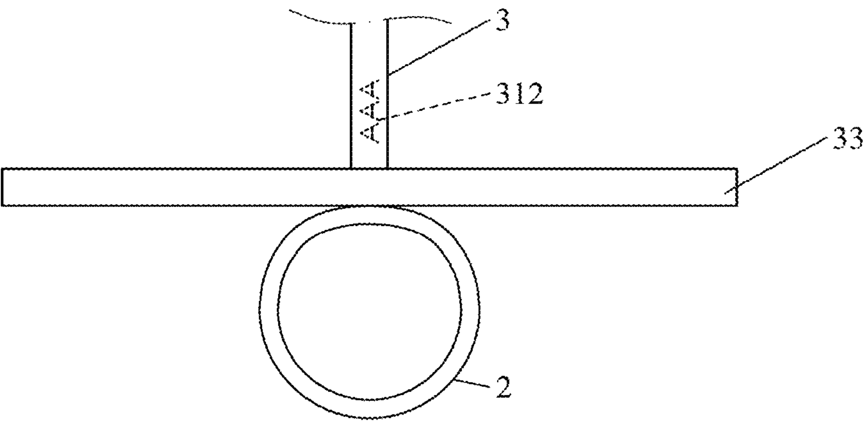
FIG. 2 is a schematic view illustrating transfer printing of a transfer printing tape of the marking device according to the present invention.
Figure 3:
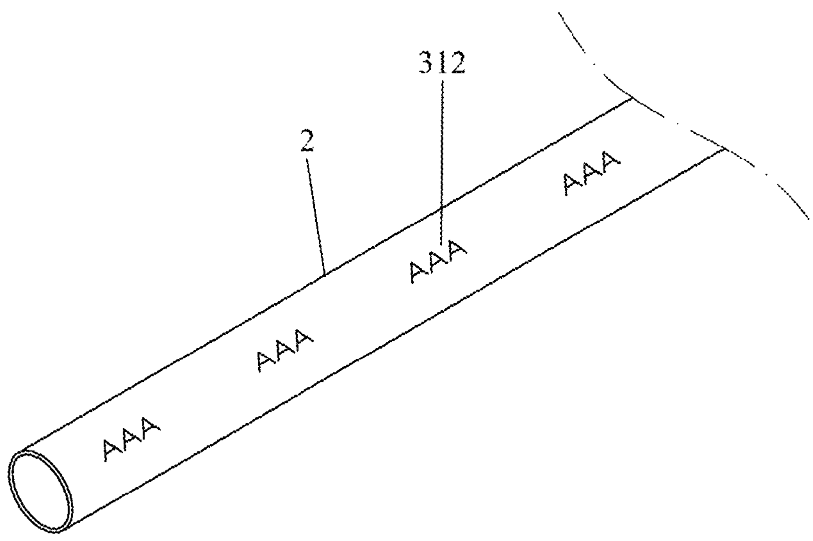
FIG. 3 is a schematic perspective view of a plastic tubing with logo patterns according to the present invention.

With reference to FIGS. 1-3, a marking device 30 for printing logo patterns on a surface of a plastic tubing 2 is configured to be disposed on an output side 11 of a plastic extrusion machine 1. The plastic tubing 2 is outputted to the output side 11 and moves rectilinearly. The marking device 30 comprises a transfer printing unit 3, a peeling unit 4, and a cooling unit 5. The transfer printing unit 3 is configured to be disposed on the output side 11 of the plastic extrusion machine 1. The transfer printing unit 3 includes a transfer printing tape 31, a shaft 32, and a pressing rod 33. The transfer printing tape 31 is coiled and has a central axial hole 311. The transfer printing tape 31 includes a surface having a plurality of logo patterns 312 which may be continuous or spaced from each other. For example, the logo patterns 312 may be spaced from each other by 60 cm or other suitable length.

The shaft 32 is configured to be disposed on a side of the plastic tubing 2 and extends through the central axial hole 311 of the transfer printing tape 31. An end of the transfer printing tape 31 is attached to the surface of the plastic tubing 2. The pressing rod 33 is configured to be disposed above the plastic tubing 2. The pressing rod 33 is configured to tightly press the transfer printing tape 31 against the surface of the plastic tubing 2. The plurality of logo patterns 312 is transferred to the plastic tubing 2 through transfer printing by heat of the plastic tubing 2 generated during formation of the plastic tubing 2.

The peeling unit 4 is disposed on a side of the transfer printing unit 3 remote from the plastic extrusion machine 1. The peeling unit 4 includes a sleeve 41 mounted around the plastic tubing 2. The sleeve 41 includes a peeling end 411 remote from the plastic extrusion machine 1. The peeling end 411 is configured to separate the transfer printing tape 31 from the plastic tubing 2.

The cooling unit 5 is disposed on a side of the peeling unit 4 remote from the plastic extrusion machine 1. The cooling unit 5 includes a guiding tube 51 which is configured to output water or other cooling fluid for cooling the plastic tubing 2. The guiding tube 51 may be disposed in a position corresponding to the sleeve 41 for cooling the sleeve 41.

According to the present invention, when the plastic tubing 2 is formed and outputted by the plastic extrusion machine 1, the temperature of the plastic tubing 2 is still higher than the room temperature and is not fully solidified. Thus, when the transfer printing tape 31 is attached to the surface of the plastic tubing 2, the transfer printing tape 31 may be attached to different locations on the surface of the plastic tubing 2 which moves rectilinearly. Furthermore, when the pressing rod 33 presses against the transfer printing tape 31, the plastic tubing 2 may slightly deform to enable snug abutting between the transfer printing tape 31 and the surface of the plastic tubing 2. Furthermore, the heat generated during formation of the plastic tubing 2 enables the logo patterns 312 of the transfer printing tape 31 to be firmly printed onto the surface of the plastic tubing 2 through heat transfer printing.

According to the present invention, when the transfer printing tape 31 reaches the position of the sleeve 41, the transfer printing tape 31 may maintain in a status stick to the surface of the plastic tubing 2 to assure that the logo patterns 312 can be printed onto the surface of the plastic tubing 2. Furthermore, when the transfer printing tape 31 reaches the peeling end 411 of the sleeve 41, the peeling end 411 serves as a pressing point to separate the transfer printing tape 31 from the plastic tubing 2, such that a section of the plastic tubing 2 entering the cooling unit 5 is without the transfer printing tape 31. Furthermore, the guiding tube 51 of the cooling unit 5 may output water to cool the plastic tubing 2 to thereby stabilize the fixed solid shape of the plastic tubing 2, and the logo patterns 312 may be firmly attached to the outer surface of the plastic tubing 2 and, thus, will not disengage from the outer surface of the plastic tubing 2 due to high temperature. Furthermore, the guiding tube 51 may also output water to cool the sleeve 41, thereby cooling the plastic tubing 2 in the sleeve 41 to enhance the cooling effect.

According to the present invention, the heat generated during formation of the plastic tubing 2 is used to stably print the logo patterns 312 onto the surface of the plastic tubing 2 through heat transfer printing without the need of additionally heating the plastic tubing 2. Furthermore, according to the present invention, when the plastic tubing 2 is extruded out of the plastic extrusion machine 1, the plastic tubing 2 moves rectilinearly without the need of an additional device for displacing the plastic tubing 2, thereby reducing the costs. According to the present invention, the logo patterns 312 may provide an excellent marking effect. When the plastic tubing 2 is cut into plural sections, each section of the plastic tubing 2 may include at least one logo pattern 312, thereby providing better marking effect and anti-counterfeiting effect.

A method for marking a surface of a plastic tubing according to the present invention comprises:

- providing a transfer printing tape 31 which is elongated and has a surface having a plurality of logo patterns 312, wherein the plurality of logo patterns 312 may be continuous or spaced at intervals; (step S1)
- disposing the transfer printing tape 31 on an output side 11 of a plastic extrusion machine 1; (step S2)
- disposing a cooling unit 5 on a side of the transfer printing tape 31; (step S3)
- outputting the plastic tubing 2 by the plastic extrusion machine 1, attaching the transfer printing tape 31 onto the surface of the plastic tubing 2 which moves rectilinearly, and transfer printing the plurality of logo patterns 312 onto the surface of the plastic tubing 2 by the heat of the plastic tubing 2 generated during formation of the plastic tubing 2; (step S4) and
- cooling the plastic tubing 2 when the plastic tubing 2 moves a position of the cooling unit 5, and separating the transfer printing tape 31 from the plastic tubing 2, leaving the plurality of logo patterns 312 firmly attached to the surface of the plastic tubing 2. (step S5)

In step S4, the heat generated during formation of the plastic tubing 2 is used to transfer the logo patterns 312 onto the surface of the plastic tubing 2 through heat transfer printing. Thus, it is not necessary to additionally heat the plastic tubing 2. Furthermore, the logo patterns 312 on the transfer printing tape 31 are, thus, printed onto the surface of the plastic tubing 2.

In step S5, the plastic tubing 2 may be completely solidified after cooling, and the logo patterns 312 may be firmly attached to the surface of the plastic tubing 2 to enhance stability of the marking.

In summary, the present invention provides enhanced printing convenience, stable marking effect, and anti-counterfeit effect. The foregoing embodiments are examples of the present invention, not limitation to the present invention. All equivalent changes made in accordance with the spirit of the present invention should also fall within the scope of the present invention.

The invention claimed is:

1. A marking device for printing logo patterns on a surface of a plastic tubing, with the marking device configured to be disposed on an output side of a plastic extrusion machine, wherein the plastic tubing is outputted to the output side and moves rectilinearly, with the marking device comprising:

a transfer printing unit configured to be disposed on the output side of the plastic extrusion machine, wherein the transfer printing unit includes a transfer printing tape and a pressing rod, wherein the transfer printing tape includes a surface having a plurality of logo patterns, wherein the pressing rod is configured to be disposed above the plastic tubing, wherein the pressing rod is configured to press the transfer printing tape against the surface of the plastic tubing, and the plurality of logo patterns is transferred to the plastic tubing through transfer printing by heat of the plastic tubing generated during formation of the plastic tubing;

a peeling unit disposed on a side of the transfer printing unit remote from the plastic extrusion machine, wherein the peeling unit includes a peeling end configured to separate the transfer printing tape from the plastic tubing; and a cooling unit disposed on a side of the peeling unit remote from the plastic extrusion machine, wherein the cooling unit includes a guiding tube for cooling the plastic tubing.

2. The marking device as claimed in claim 1, wherein the transfer printing unit further includes a shaft, wherein the transfer printing tape is coiled and has a central axial hole, wherein the shaft is configured to be disposed on a side of the plastic tubing and extends through the central axial hole of the transfer printing tape, and wherein an end of the transfer printing tape is attached to the surface of the plastic tubing.

3. The marking device as claimed in claim 2, wherein the plurality of logo patterns is continuous or spaced at intervals.

4. The marking device as claimed in claim 1, wherein the peeling unit includes a sleeve mounted around the plastic tubing, and wherein the peeling end is located on an end of the sleeve remote from the plastic extrusion machine.

5. The marking device as claimed in claim 1, wherein the guiding tube is configured to output water for cooling the plastic tubing.

6. The marking device as claimed in claim 1, wherein the guiding tube is mounted to the peeling unit.

7. A method for marking a surface of a plastic tubing, with the method comprising:

providing a transfer printing tape which is elongated and has a surface having a plurality of logo patterns;

disposing the transfer printing tape on an output side of a plastic extrusion machine;

disposing a cooling unit on a side of the transfer printing tape;

outputting the plastic tubing by the plastic extrusion machine, attaching the transfer printing tape onto the surface of the plastic tubing which moves rectilinearly, and transfer printing the plurality of logo patterns onto the surface of the plastic tubing by heat of the plastic tubing generated during formation of the plastic tubing; and cooling the plastic tubing when the plastic tubing moves a position of the cooling unit, and separating the transfer printing tape from the plastic tubing, leaving the plurality of logo patterns firmly attached to the surface of the plastic tubing.

8. The method as claimed in claim 7, wherein the plurality of logo patterns is continuous or spaced at intervals.

* * * * *